US010944696B2

(12) United States Patent
Galles

(10) Patent No.: US 10,944,696 B2
(45) Date of Patent: Mar. 9, 2021

(54) VARIABLE-LENGTH PACKET HEADER VECTORS

(71) Applicant: Pensando Systems Inc., San Jose, CA (US)

(72) Inventor: Michael Brian Galles, Los Altos, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 16/279,572

(22) Filed: Feb. 19, 2019

(65) Prior Publication Data
US 2020/0267098 A1 Aug. 20, 2020

(51) Int. Cl.
| | |
|---|---|
| *H04L 12/931* | (2013.01) |
| *H04L 12/935* | (2013.01) |
| *H04L 29/06* | (2006.01) |
| *H04L 12/721* | (2013.01) |
| *H04L 12/825* | (2013.01) |
| *H04L 12/851* | (2013.01) |
| *H04L 12/865* | (2013.01) |

(52) U.S. Cl.
CPC .......... *H04L 49/608* (2013.01); *H04L 45/38* (2013.01); *H04L 47/2433* (2013.01); *H04L 47/263* (2013.01); *H04L 47/6275* (2013.01); *H04L 49/3063* (2013.01); *H04L 69/22* (2013.01)

(58) Field of Classification Search
CPC . H04L 49/608; H04L 47/263; H04L 49/3063; H04L 47/2433; H04L 69/22; H04L 47/6275; H04L 45/38
See application file for complete search history.

(56) References Cited

U.S. PATENT DOCUMENTS

| | | | |
|---|---|---|---|
| 7,848,237 B2 | 12/2010 | Todd et al. | |
| 8,458,784 B2 | 6/2013 | Krumel | |
| 1,022,538 A1 | 3/2019 | Bosshart | |
| 1,043,252 A1 | 10/2019 | Bosshart | |
| 10,511,523 B1 * | 12/2019 | Bosshart | ............... H04L 45/745 |

(Continued)

FOREIGN PATENT DOCUMENTS

WO   WO-2020172129 A1   8/2020

OTHER PUBLICATIONS

PCT/US2020/018580 International Search Report and Written Opinion dated May 7, 2020.

*Primary Examiner* — Christopher P Grey
(74) *Attorney, Agent, or Firm* — Wilson Sonsini Goodrich & Rosati

(57) ABSTRACT

Methods and network interface modules for processing packet headers are provided. The method comprises: receiving a packet comprising a header and a payload; generating, using the header, an initial packet header vector (PHV); providing the initial PHV to a pipeline comprising a plurality of processing stages; and processing the initial PHV in the pipeline, wherein the processing comprises, for a current processing stage in the plurality of processing stages: receiving, by the current processing stage, an input PHV, wherein the input PHV (i) is the initial PHV or a modified version of the initial PHV and (ii) comprises one or more flits, and applying a feature to the input PHV to generate an output PHV, including increasing an initial length of the input PHV if the initial length is not sufficient to apply the feature.

24 Claims, 5 Drawing Sheets

(56) References Cited

U.S. PATENT DOCUMENTS

| | | |
|---|---|---|
| 2004/0160970 A1* | 8/2004 | Dally .................... H04L 49/602 370/412 |
| 2006/0195872 A1* | 8/2006 | Seo .................... H04N 21/4126 725/87 |
| 2012/0099475 A1 | 4/2012 | Tokuoka |
| 2015/0010005 A1* | 1/2015 | Yoshida .............. G06F 13/4059 370/392 |
| 2017/0093986 A1* | 3/2017 | Kim ........................ H04L 49/00 |
| 2018/0041615 A1 | 2/2018 | Bosshart et al. |
| 2018/0159766 A1* | 6/2018 | Cui ....................... H04L 45/302 |
| 2019/0372895 A1* | 12/2019 | Parthasarathy ......... H04L 45/16 |

* cited by examiner

200

| PHV Intrinsic Fields | |
|---|---|
| Field Name | Width |
| Global Intrinsics, Flit 0 | |
| tm_type | 4 |
| error_bits | 6 |
| csum_error | 5 |
| debug_trace | 1 |
| tm_oq | 5 |
| hw_error | 1 |
| bypass | 1 |
| drop | 1 |
| tm_q_depth | 14 |
| tm_cpu | 1 |
| tm_replicate_en/ rep/cap | 1 |
| tm_replicate_ptr/ id | 16 |
| tm_span_session | 8 |
| timestamp | 48 |
| lif | 11 |
| tm_iq | 5 |
| tm_oport | 4 |
| tm_iport | 4 |
| Total= | 136 |

| P4 Intrinsics, Flit 0 | | TxDMA Intrinsics, Flit 0 | | RxDMA Intrinsics, Flit 0 | |
|---|---|---|---|---|---|
| hdr_vld | 128 | padding | 264 | padding | 264 |
| padding | 208 | txdma_rse | 5 | txdma_rse | 5 |
| | | | | rx_splitter_offset | 10 |
| | | qtype | 3 | qtype | 3 |
| | | qstate_addr | 34 | qstate_addr | 34 |
| | | dma_cmd_ptr | 6 | dma_cmd_ptr | 6 |
| | | qid | 24 | qid | 24 |
| paddingpacket_len | 14 | paddingpacket_len | 14 | paddingpacket_len | 14 |
| recirc | 1 | recirc | 1 | recirc | 1 |
| no_data | 1 | no_data | 1 | no_data | 1 |
| frame_aize | 14 | frame_aize | 14 | frame_aize | 14 |
| p4_pad0 | 1 | p4_pad0 | 1 | p4_pad0 | 1 |
| parser_err | 1 | parser_err | 1 | parser_err | 1 |
| recirc_count | 3 | recirc_count | 3 | recirc_count | 3 |
| len_err | 4 | len_err | 4 | len_err | 4 |
| crc_err | 1 | crc_err | 1 | crc_err | 1 |
| Total= | 376 | Total= | 376 | Total= | 386 |

FIG. 2

VARIABLE-LENGTH PACKET HEADER VECTORS

BACKGROUND

Computing environments generally include hosts, client devices, and wired or wireless networks, e.g., the Internet, that communicatively couples the hosts to the client devices. The hosts and client devices can be configured to communicate with each other over the wired or wireless networks via input/output ("IO") devices, e.g., network interface cards ("NICs"), built into the hosts and client devices. The IO devices can include a set of device registers and memory-based data structures. Such registers and data structures are generally fixed for a given IO device, allowing a specific device driver program to control the IO device.

IO devices—and other similar network switches and routing devices—receive data in the form of network packets at one of a set of input interfaces and forward those packets to one or more of a set of output interfaces. A network packet generally includes a payload, i.e., the data being transmitted, and control information, e.g., source and destination addresses for the payload, error detection codes, and other status identifiers. The control information is generally included in a header in the network packet, and an IO device can be configured to parse and process the header to forward the network packet to the correct destination and apply other features to the packet. For example, an IO device, when combined with specialized hardware functions, can provide capabilities including packet switching, security, deep packet inspection, and the like. Such an IO device can execute instructions to manipulate packet fields and lookup table data to direct packet forwarding and rewrite operations.

Users typically require that IO devices operate as quickly as possible in order to keep pace with a high rate of incoming packets. One challenge associated with network systems relates to providing flexible network interfaces so as to adapt to changes in the network device structure and feature set, various protocols, operating systems, applications, and the rapid development of device models.

SUMMARY

To address the challenges discussed above, NICs can include a programmable pipeline for packet forwarding and rewrite. Such a programmable pipeline can generate a packet header vector (PHV) from a packet header and pass that PHV through multiple processing stages that apply features to the PHV. For example, the processing stages can add a field to the PHV that specifies (i) a destination address for the packet, (ii) a flow table state, or (iii) a firewall status. Adding a field to the PHV can include performing a match-action, i.e., performing a lookup of a header field in a match-action table and performing an action corresponding to a match in the table.

Generally, PHVs have a fixed length. Fixed-length PHVs can be simple to implement and pass through a processing pipeline. However, fixed-length fixed PHVs can accommodate only a fixed-number of fields and only a fixed number of match-action table accesses, which are limited to a single cycle as the PHV passes through the pipeline. This specification describes technologies for implementing variable-length PHVs through time-division multiplexing. Variable-length PHVs are PHVs to which one or more additional flits or cycles can be added during processing, enabling PHVs to grow with feature demand and provide additional opportunities for match-action table lookups. Time-division multiplexing is a method of transmitting and receiving independent signals over a common signal path by means of synchronized switches at each end of the signal so that each signal appears on the path only a fraction of the time in an alternating pattern. Variable-length PHVs allow for the number of processing stages in a processing pipeline to be minimized because a particular processing stage can process a PHV multiple times, e.g., once per flit or cycle of the PHV, if necessary. Additionally, because the length of PHVs can be increased or decreased as feature demand increases or decreases, processing time is optimized.

Accordingly, in one aspect, disclosed herein is a method for processing packets, the method comprising: receiving a packet comprising a header and a payload; generating, using the header, an initial PHV; providing the initial PHV to a pipeline comprising a plurality of processing stages; and processing the initial PHV in the pipeline, wherein the processing comprises, for a current processing stage in the plurality of processing stages: receiving, by the current processing stage, an input PHV, wherein the input PHV (i) is the initial PHV or a modified version of the initial PHV and (ii) comprises one or more flits, and applying a feature to the input PHV to generate an output PHV, including increasing an initial length of the input PHV if the initial length is not sufficient to apply the feature.

In some embodiments, the processing further comprises providing the output PHV to (i) a next processing stage in the plurality of processing stages in the pipeline if the current processing stage is not a last processing stage or (ii) a de-parser or a direct memory access (DMA) engine if the current processing stage is the last processing stage.

In some embodiments, applying a feature to the input PHV comprises adding a new field to the input PHV.

In some embodiments, the initial PHV comprises a plurality of intrinsic fields. In such embodiments, applying a feature to the input PHV can comprise modifying one of the plurality of intrinsic fields of the initial PHV. In such embodiments, applying a feature to the input PHV can alternatively or additionally comprise replacing one of the plurality of intrinsic fields of the initial PHV with a new field.

In some embodiments, applying a feature to the input PHV comprises performing a match-action or a series of match-action combinations.

In some embodiments, the applied feature comprises an L2 or L3 header that specifies a destination of the packet. In some embodiments, the applied feature comprises a flow state table. In some embodiments, the applied feature comprises a firewall status.

In some embodiments, increasing the initial length of the input PHV comprises adding one or more flits to the input PHV through time division multiplexing.

In some embodiments, the method further comprises alternating, in the pipeline, packets comprising a large number of flits and packets comprising a small number of flits to maintain an average packet processing rate that meets a predefined threshold. In some embodiments, the method further comprises processing, in the pipeline, packets in a priority order, wherein the priority order is defined by a quality of service tag associated with each packet.

In another aspect, disclosed herein is a network interface module comprising: input circuitry configured to receive a packet comprising a header and a payload; a parser configured to generate, using the header, an initial PHV; and a processing pipeline comprising a plurality of processing stages, wherein each of the plurality of processing stages is configured to: receive an input PHV, wherein the input PHV (i) is the initial PHV or a modified version of the initial PHV and (ii) comprises a plurality of flits, and apply a feature to the input PHV to generate an output PHV, including increasing an initial length of the input PHV if the initial length is not sufficient to apply the feature.

In some embodiments, each of the plurality of processing stages is further configured to provide the output PHV to (i) a next processing stage in the plurality of processing stages in the pipeline if the processing stage is not a last processing stage or (ii) a de-parser or a direct memory access (DMA) engine if the processing stage is the last processing stage.

In some embodiments of the network interface module, applying a feature to the input PHV comprises adding a new field to the input PHV.

In some embodiments of the network interface module, the initial PHV comprises a plurality of intrinsic fields. In such embodiments, applying a feature to the input PHV can comprise modifying one of the plurality of intrinsic fields of the initial PHV. In such embodiments, applying a feature to the input PHV can alternatively or additionally comprise replacing one of the plurality of intrinsic fields of the initial PHV with a new field.

In some embodiments of the network interface module, applying a feature to the input PHV comprises performing a match-action or a series of match-action combinations.

In some embodiments of the network interface module, the applied feature comprises an L2 or L3 header that specifies a destination of the packet. In some embodiments of the network interface module, the applied feature comprises a flow state table. In some embodiments of the network interface module, the applied feature comprises a firewall status.

In some embodiments of the network interface module, increasing the initial length of the input PHV comprises adding one or more flits to the input PHV through time division multiplexing.

In some embodiments of the network interface module, the method further comprises alternating, in the pipeline, packets comprising a large number of flits and packets comprising a small number of flits to maintain an average packet processing rate that meets a predefined threshold. In some embodiments of the network interface module, the method further comprises processing, in the pipeline, packets in a priority order, wherein the priority order is defined by a quality of service tag associated with each packet.

It shall be understood that different aspects of the invention can be appreciated individually, collectively, or in combination with each other. Various aspects of the invention described herein may be applied to any of the particular applications set forth below or for any other types of the data processing system disclosed herein. Any description herein concerning the data processing may apply to and be used for any other data processing situations. Additionally, any embodiments disclosed in the context of the data processing system or apparatuses are also applicable to the methods disclosed herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 depicts a table of example intrinsic fields;

DETAILED DESCRIPTION

Figure 1:
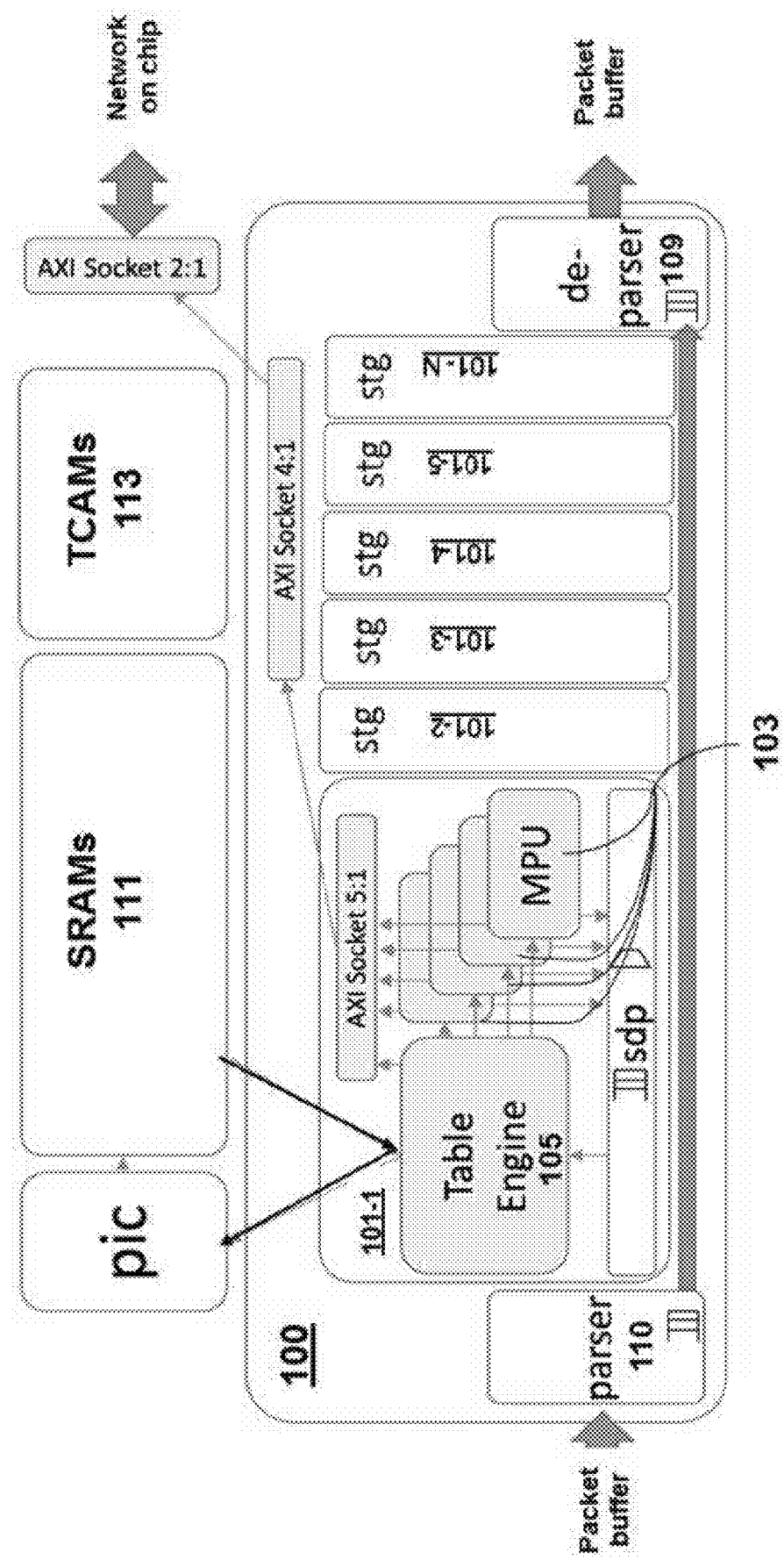
FIG. 1 is a diagram of an example pipeline for processing packet headers.

Described herein, in certain embodiments, are methods and apparatuses for processing network packet headers.

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

Reference throughout this specification to "some embodiments," or "an embodiment," means that a particular feature, structure, or characteristic described in connection with the embodiment is included in at least one embodiment. Thus, the phrase "in some embodiments," or "in an embodiment," does not necessarily refer to the same embodiment. Furthermore, the particular features, structures, or characteristics may be combined in any suitable manner in one or more embodiments.

As utilized herein, terms "component," "system," "interface," "unit," "block," "device" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Moreover, the word "exemplary" where used herein means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

The term "table" refers to a variety types of tables involved in data or packet processing. For example, a table can be a match table used in a match-action stage, e.g., a forwarding table, a hash table for Ethernet address lookup, a longest-prefix match table for IPv4 or IPv6, or a wildcard lookup table for Access Control Lists (ACLs). These tables can be stored in various memory locations such as in internal static random access memory (SRAM), NIC DRAM, or host memory.

The term "match-action" refers to the paradigm for network packet switching (such as that performed by an Open-Flow switch or P4 pipeline, which uses match tables, action tables, statistics memories, meters memories, stateful memories, and ternary indirection memories). The term "P4" refers to a high-level language for programming protocol-independent packet processors. P4 is a declarative language for expressing how packets are processed by the pipeline of a network forwarding element such as a switch, NIC, router or network function appliance. It is based upon an abstract forwarding model consisting of a parser and a set of match-action table resources, divided between ingress and egress. The parser identifies the headers present in each incoming packet. Each match-action table performs a lookup on a subset of header fields and applies the actions corresponding to the first match within each table.

While portions of this disclosure, for demonstrative purposes, refer to wired and/or wired communication systems or methods, embodiments of the invention are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or NIC with OS bypass capabilities, or to a to a fast or high-speed interconnect infrastructure or fabric, embodiments of the invention are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the invention may be utilized in conjunction with InfiniBand (IB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that allow a user mode application to directly access such hardware by bypassing a call to the operating system (namely, with OS bypass capabilities); with infrastructures, fabrics, components, adapters, host channel adapters, cards or NICs that are connectionless and/or stateless; and/or other suitable hardware.

Computer systems employ a wide variety of peripheral components or IO devices. A host processor of a computer system can be connected to one or more IO devices through a component bus defined by Peripheral Component Interconnect Express (PCIe), a high-speed serial computer expansion bus standard. Device drivers (also referred to drivers) are hardware-specific software that control the operation of hardware devices connected to computing systems.

In computing, virtualization techniques are used to allow multiple operating systems to simultaneously share processor resources. One such virtualization technique is Single Root I/O Virtualization (SR-IOV), which is described in the PCI-SIG Single Root I/O Virtualization and Sharing Specifications. A physical device may allow multiple virtual machines to use the device concurrently through SR-IOV. In SR-IOV, a physical device may have physical functions (PFs) that allow for input/output operations and device configuration, as well as one or more virtual functions (VFs) that allow for data input/output. According to SR-IOV, a Peripheral Component Interconnect Express (PCIe) device can appear to be multiple separate physical PCIe devices. For example, a SR-IOV network interface card (NIC) having a single port can have up to 256 virtual functions, with each virtual function representing a respective NIC port.

FIG. 1 is a diagram of an example pipeline 100 for processing packet headers. Packet headers can contain control information, e.g., source and destination addresses, flow table states, firewall statuses, timestamps, and other status identifiers. Generally, a parser receives a packet and identifies and extracts the control information from fields in the header to generate a packet header vector (PHV). The PHV is a vector or data structure that contains the identified and extracted header fields organized in such a way that the header fields can be easily processed. The PHV can include one or more flits. Flits are logical units of information into which the PHV can be partitioned. The flits in the PHV can be pipelined through the processing stages of the pipeline 100.

The pipeline 100 can apply one or more features to the PHV by adding, removing, or modifying one or more fields of the PHV. The applied features define how the packet should be handled by subsequent components of the IO device in which the pipeline 100 is implemented.

The pipeline 100 can be a component of a programmable IO device, e.g., a network interface card (NIC). The programmable IO device can perform a variety of functions for a computing system. For example, the programmable IO device can provide network connectivity functions to the computing system, coprocessor functionality, encryption and decryption, and the like. The programmable IO device can interface with other components in the computing system via, for example, a PCIe bus.

The programmable IO device can have one or more physical functions ("PFs") or virtual functions ("VFs") through which the computing system can communicate with the programmable IO device. PFs are physical PCIe devices, e.g., Ethernet ports. VFs are virtual devices. A programmable IO device with SR-IOV capabilities (described above) can be configured to appear in the PCI configuration space as multiple functions, i.e., multiple VFs. PFs can configure and manage the SR-IOV functionality by assigning VFs. In some cases, the PFs can include extended operations including allocating, configuring and freeing VFs, discovering hardware capabilities of VFs, such as Receive Side Scaling (RSS), discovering hardware resources of VFs, such as number of queues and interrupt resources, configuring the hardware resources and features of a VF, saving and restoring hardware states, and the like.

The pipeline 100 can execute a wide range of P4 programs. The pipeline 100 can be programmed to perform functions including, for example, routing, bridging, tunneling, forwarding, flow-based rate-limiting, label push/pop operations, L4 load balancing, L4 flow tables analytics and flow-specific processing, DDOS attack detection, mitigation, telemetry data gathering, and various others.

The pipeline 100 may include a parser 110. Although only a single parser is depicted in FIG. 1, the pipeline 100 can include multiple parsers operating in parallel. The parser 110 can be a P4 compliant programmable parser. The parser 110 can extract packet header fields according to P4 header definitions and place them in a PHV. The parser 110 can identify and select one or more fields from the packet header and align the information from the selected fields to create the PHV.

The PHV generated by the parser 110 can have any size or length. For example, the PHV can be at least 512 bits, 256 bits, 128 bits, 64 bits, 32 bits, 8 bits or 4 bits. In some cases, a long PHV (e.g., 6 Kb) is needed to hold all relevant header fields and metadata. In such cases, a single PHV can be time-division multiplexed across several cycles. The use of time-division multiplexing can allow the pipeline 100 to accommodate variable-length PHVs. That is, PHV length can vary as the PHV passes through the processing stages of the pipeline 100. Time-division multiplexing of variable-length PHVs will be described in more detail below.

After the parser 110 generates the PHV, the pipeline 100 may pass the PHV through one or more processing stages, e.g., processing stages 101-1, 101-2, 101-3, 101-4, 101-5, and 101-N. The processing stages can each apply one or more features to the PHV.

Applying a feature to the PHV can involve adding a new field to the PHV. Alternatively or additionally, applying a feature to the PHV can involve modifying or replacing an intrinsic field of the PHV. An intrinsic field may be a field that is defined in hardware and that the PHV has before it passes through any of the processing stages 101-1 to 101-N. Intrinsic fields can be included in the first flit of a multi-flit PHV to direct the processing of the remaining flits.

FIG. 2 depicts a table 200 of intrinsic fields. The fields in table 200 are merely illustrative, and implementations of the technology described in this specification can include more or fewer intrinsic fields. The intrinsic fields can include global intrinsic fields, P4 intrinsic fields, transmit direct memory access ("TxDMA") intrinsic fields, and receive direct memory access ("RxDMA") intrinsic fields. Global intrinsic fields can include, for example, error fields, timestamp fields, and input and output port fields, among others. P4 intrinsic fields can include padding fields, packet length fields, frame size fields, error fields, and others. And TxDMA and RxDMA fields can include address fields, queue ID fields, error fields, and others.

Returning to FIG. 1, applying a feature may also involve performing a match-action or a series of match-action combinations. A match-action is a set of dependent or independent table lookups and corresponding actions. A particular match-action stage can be configured to match one or more PHV fields to entries in a table and update the PHV fields or table entries according to one or more actions specified by a P4 program. For example, performing a match-action can involve performing a table lookup for a datagram destination specified in a PHV field (match) and writing to the PHV field a corresponding output port (action).

The processing stages 101-1 to 101-N can share a common set of static random access memories ("SRAMs") 111 and ternary content-addressable memories ("TCAMs") 113 that store the match tables.

Each match-action processing stage can include a table engine 105 and multiple match processing units (MPUs) 103. The table engine 105 can be configured to support per-stage table matches. For example, the table engine 105 can be configured to hash, lookup, and/or compare keys, e.g., PHV fields, to entries in a particular table. The table engine 105 can be configured to control (i) the address and size of the table, (ii) the PHV fields to use as lookup keys, and MPU instruction vectors that define the P4 program associated with the table. The table engine 105 can distribute a result to the MPUs 103. The MPUs 103 can then perform the action associated with the result.

The table engine 105 can additionally be configured to control match table selections. That is, the table engine 105 can examine an incoming PHV to determine which table or tables to enable for the PHV. Table selection criteria can be based on information contained in the PHV. In some cases, the table engine 105 can select a table based on packet-type information in the PHV. For example, the table selection criteria can include packet type or packet protocol (e.g., Internet Protocol version 4 (IPv4), Internet Protocol version 6 (IPv6) and Multiprotocol Label Switching (MPLS)) or the next table ID as determined by the preceding stage. In some cases, the incoming PHV may be analyzed by the table selection logic, which then generates a table selection key and compares the result using a TCAM to select the active tables. The table selection key may be used to drive table hash generation, table data comparison, and associated data into the MPUs 103.

In some implementations, the table engine 105 can includes hash generation unit. The hash generation unit can be configured to generate a hash result of a PHV input, e.g., a PHV field. The hash result can be used to conduct a DMA read from the SRAM 111. In an example, the input to the hash generation unit can be masked according to which bits in the table selection key contribute to the hash entropy. In some cases, the same mask may be used by the table engine 105 for comparison with the returned SRAM data. In some instances, the hash result may be scaled according to the table size. Then the table base offset may be added to create the memory index. The memory index may be sent to the SRAM 111 to perform the read.

In some cases, the table engine 105 includes a TCAM control unit. The TCAM control unit can be configured to allocate memory to store multiple TCAM search tables. In an example, a PHV field can be used in a TCAM search stage that returns a full or partial SRAM address before an SRAM lookup. The results of such a TCAM search can be forwarded to the table engine 105 for an SRAM lookup. TCAM search tables can be configured to be up to 1024 bits wide and as deep as TCAM resources permit. The TCAM control unit can be configured to allocate different TCAMs 113 to individual processing stages so as to prevent TCAM resource conflicts, or to allocate TCAM into multiple search tables within a processing stage.

As mentioned above, each processing stage can also include one or more MPUs 103. The MPUs 103 can include, for example, an instruction fetch unit, a register file, a communication interface, arithmetic logic units (ALUs), and various other functional units. The MPUs 103 can be configured to perform various packet processing operations. For example, the MPUs 103 can be configured to update PHV data structures, perform table maintenance operations such as writing timestamps to tables or harvesting table data for export, and perform administrative operations such as creating new queues or memory maps and gathering statistics.

Each of the processing stages 101-1 to 101-N can also be configured to time-division multiplex PHVs. The processing stages can time-division multiplex PHVs by partitioning the PHVs into multiple flits. Each flit can be a data structure comprising a plurality of PHV fields. Each flit can be limited to a fixed number of bits corresponding to a bus width of the pipeline 100, e.g., 512 bits. Using a multiplexor with a time-based control signal, a particular processing stage in the pipeline 100 can provide one flit per clock cycle to a next processing stage.

Figure 3:
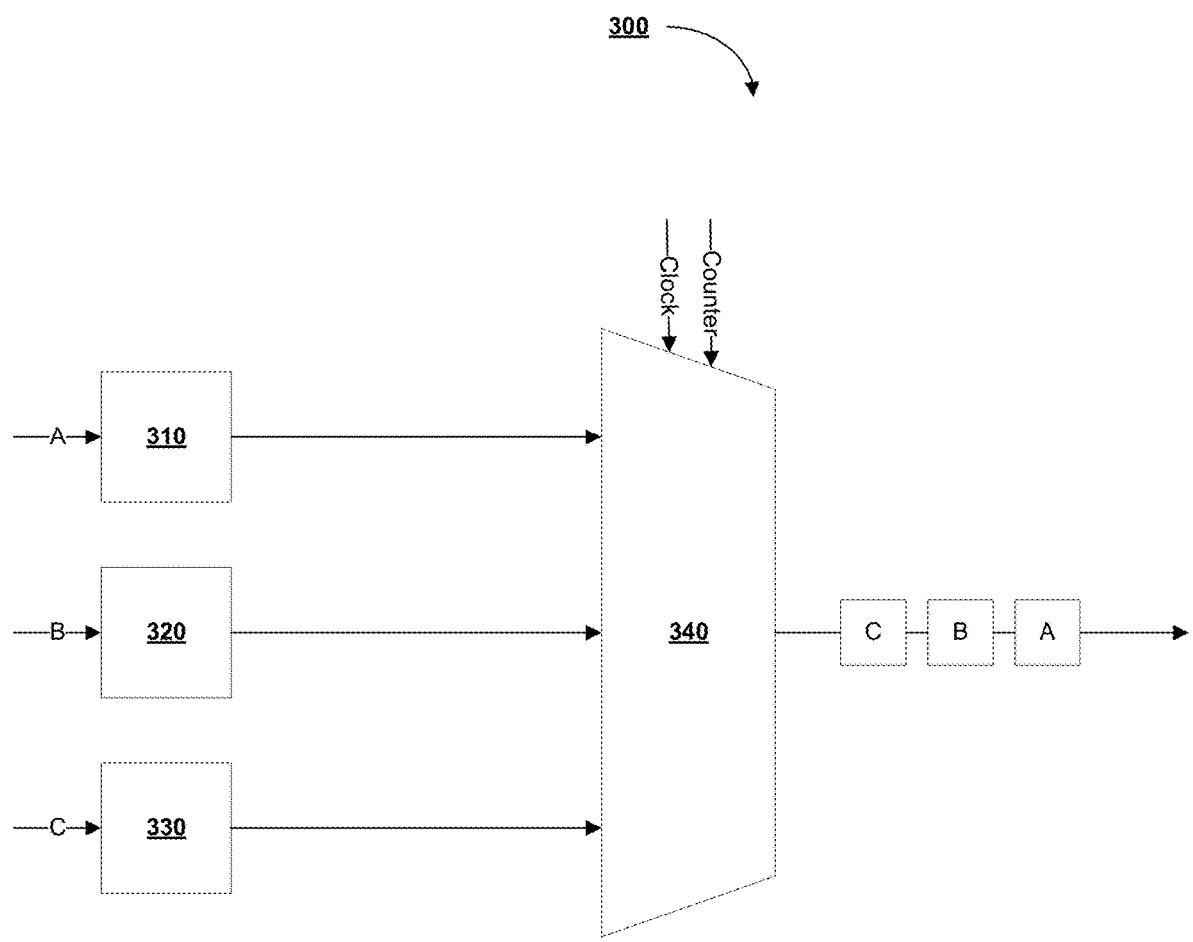
FIG. 3 depicts an example time-division multiplexor.

FIG. 3 depicts an example time-division multiplexor 300. Such a time-division multiplexor can be included in one or more of the processing stages 101-1 to 101-N.

Signals A, B, and C, which can correspond to three different flits of a PHV, can be maintained in registers 310, 320, and 330, respectively. Using a clock signal and a counter as control signals, a multiplexor 340 can alternately select signals A, B, and C on consecutive clock cycles. The output of the multiplexor 340 is a time-division multiplexed version of the PHV. In the example depicted in FIG. 3, the multiplexor 340 first transmits signal A, followed by signals B and C.

The time-division multiplexor 300 can have a large number of inputs and a large number of registers to accommodate a large number of flits per PHV. The range of the counter can be programmatically defined to facilitate different PHV lengths. For example, the counter can be programmatically defined to count repeatedly from 0 to 2 when the number of flits per PHV is 3, but from 0 to 5 when the number of flits per PHV is 6. In some implementations, the time-division multiplexor 300 has as many as 12 or 16 registers and 12 or 16 inputs. Longer PHVs, i.e., PHVs having more flits, will occupy the pipeline 100 for a longer period of time, leading to a lower packet per second processing rate. To compensate, the processing pipeline 100 can include a scheduler between the parser 110 and the processing stages that alternately provides long, complex PHVs and short, simple PHVs to the processing stages to maintain a higher packet per second processing rate. The scheduler can differentiate between the two types of PHVs by examining intrinsic fields in the PHVs, e.g., intrinsic fields that indicate how large the corresponding packets are.

Alternatively or additionally, the scheduler can provide the packets to the processing pipeline 100 in a priority order. The priority order can be defined by quality of service tags associated with the packets.

Time-division multiplexing allows PHVs to be variable-length. This is advantageous for several reasons. First, PHVs can grow to accommodate additional fields and additional features that would not necessarily fit into a fixed-length PHV of a particular size. PHVs that need to store extended feature data can grow across multiple cycles in support of complex features, while simple packets or packets needing little processing can use the minimum-sized PHV. For example, PHVs can grow to accommodate memory descriptors, which are used to copy packets to/from memory. This is advantageous because memory descriptor lists can be very long. As another example, a P4 program in the pipeline 100 may need to examine some payload data. In such a case, the payload data can be included in the PHV by time-division multiplexing the PHV.

Alternatively, a PHV can actually shrink to make the most efficient use of the processing pipeline 100. For example, if an IO device drops a particular packet, the pipeline 100 may only need to forward the packet's statistics to a later stage, which would require only a short PHV.

Second, a particular match-action processing stage can process a PHV two or more times, e.g., one time per flit of the PHV. For example, two common match tables used in networking are layer 2 (L2) and layer 3 (L3) station tables, which are generally accessed using both a packet's source address key and destination address key. With a single-cycle PHV implementation, the table can only be accessed once, so it must copied and used in two separate processing stages. Using a time-division multiplexed PHV, multiple cycles are available to access a single table with different keys, allowing a single station table to serve multiple purposes.

Returning again to FIG. 1, the pipeline 100 also includes a de-parser 109 that can rewrite the original packet according to the PHV fields which have been modified, e.g., added, removed, or updated. In some cases, the packet processed by the pipeline 100 can be placed in a packet buffer for scheduling and possible replication.

In some implementations, the pipeline 100 instead provides the PHV to a direct memory access (DMA) engine. In such implementations, the DMA engine can write the corresponding packet directly to memory in the computing system in which the I/O device is implemented.

Figure 4:
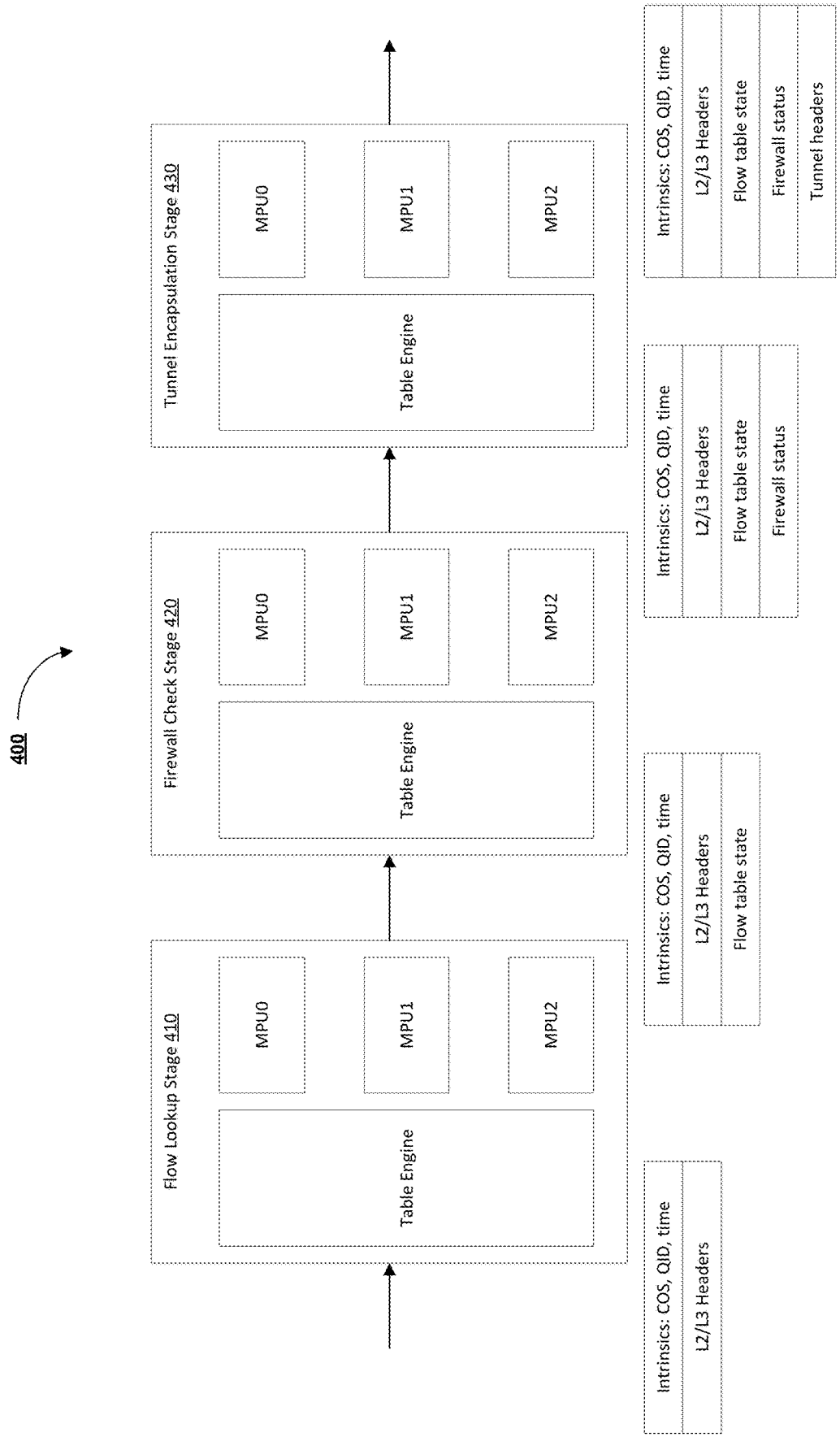
FIG. 4 is a diagram of an example processing pipeline for processing a PHV.

FIG. 4 is a diagram of an example processing pipeline 400 for processing a PHV. The processing pipeline 400 includes three processing stages 410, 420, and 430. The processing stage 410 applies a flow table state to the PHV by adding a flit to the PHV. A flit is sub-component of a packet. It represents a logical unit of information that can be transmitted in a single cycle. Thus, adding a flit to the PHV increases the amount of time that the PHV will remain in the processing pipeline 400 because each flit is individually transmitted through the pipeline. The processing stage 410 can partition the PHV into multiple flits through time-division multiplexing, which is a method of transmitting and receiving independent signals over a common signal path by means of synchronized switches at each end of the signal path so that each signal appears on the path only a fraction of the time in an alternating pattern. That is, the individual flits in the PHV can be transmitted through the pipeline 400 in an alternating fashion across multiple cycles. This can allow multiple match-actions per stage, e.g., one per flit in the PHV if necessary. The processing stage 420 applies a firewall status to the PHV and extends the PHV by an additional flit. The processing stage 430 applies a tunnel header to the PHV and again extends the PHV by an additional flit. One example is adding a tunnel header. The header can be larger, in the case of a full IPv6+L2 tunnel header, or smaller, in the case of a such as a Multi-Protocol Label Switching ("MPLS") header. A variable-length PHV allows the size of extracted payload to vary as required. The length of the PHV can even vary from processing stage to processing stage as the PHV is multiplexed and de-multiplexed and as multiple flits are recombined into one.

Figure 5:
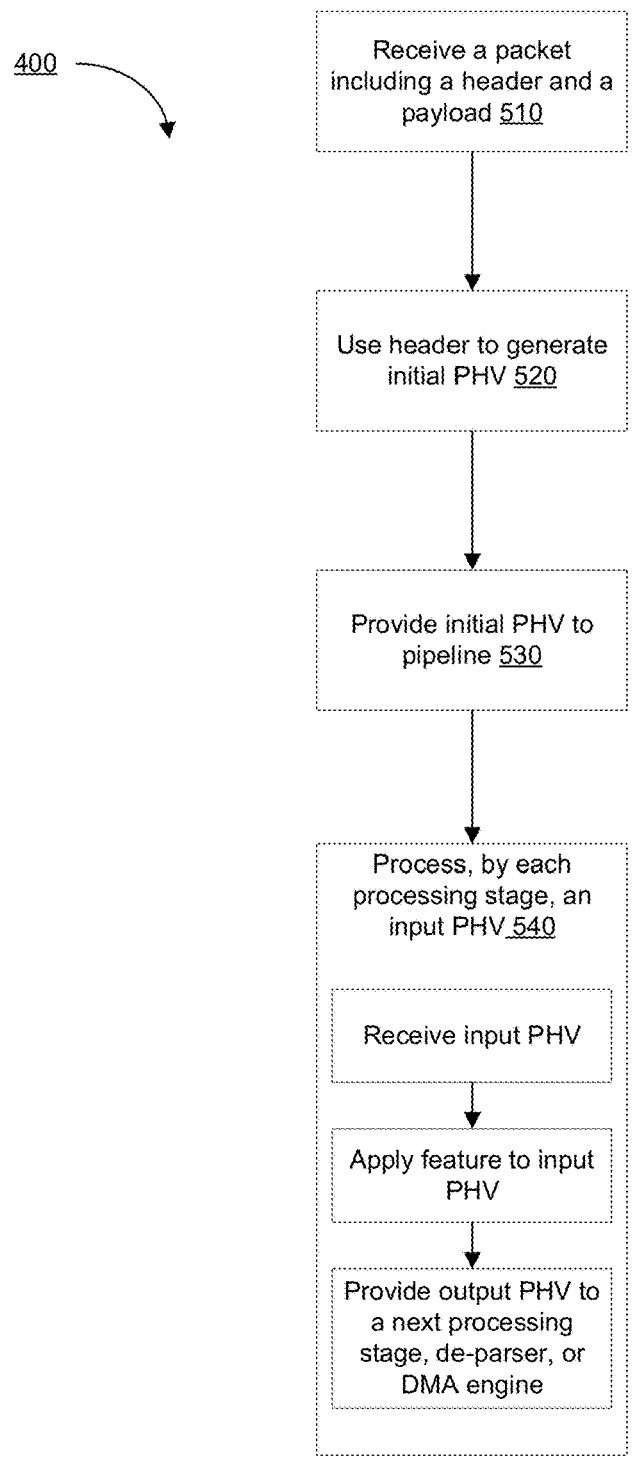
FIG. 5 is a flow chart of an example process for processing packet headers.

FIG. 5 is a flow chart of an example process 500 for processing packet headers. The process can be performed by components of a processing pipeline, e.g., the processing pipeline 100 described in reference to FIG. 1.

The processing pipeline receives a packet including a header and a payload (510). The payload can include the data that is being transmitted in the packet. The header can include control information for routing the packet to the appropriate destination.

A component of the processing pipeline, e.g., a parser, uses the header to generate an initial PHV (520). Generating the initial PHV can involve identifying and extracting header fields from the header. The PHV can be a vector or data structure that contains the identified and extracted header fields organized in such a way that the header fields can be easily processed.

The parser then provides the initial PHV to a pipeline having a plurality of processing stages (530).

Each processing stage in the pipeline receives an input PHV. The input PHV is either the initial PHV or a previously modified version of the initial PHV. For example, if the current processing state is a first processing stage, it receives the initial, unmodified PHV. However, if the current processing stage is a third or fourth processing stage, for example, the initial PHV may have been modified by a previous processing stage. The input PHV includes one or more flits, and the processing stage can process the PHV in a corresponding number of clock cycles, i.e., one cock cycle per flit in the PHV.

Each processing stage in the processing pipeline then processes the PHV (540). Processing the PHV can involve applying a feature to the input PHV to generate an output PHV. As previously discussed, applying a feature to input PHV can involve adding a new field to the input PHV, or modifying or replacing an intrinsic field of the PHV, i.e., a field included in the initial PHV and defined in hardware rather than software. Adding, modifying, or replacing a field of the PHV can involve performing a match-action or a series of match-action combinations as described in detail in reference to FIG. 1. The field or feature can be an L2 or L3 header, a flow table state, a firewall status or the like.

In applying the feature to the PHV, the processing stage can increase the input length of the PHV, i.e., the number of flits in the input PHC, through time-division multiplexing if the initial length of the of the input PHV is not sufficient to apply the feature. For example, if the feature is applied by performing a match-action, but two match table accesses are required to apply the feature, then the processing stage can add an additional flit (cycle) to the PHV to accommodate the additional table access. In other cases, the length of the input PHV may be sufficient to accommodate the feature. In such cases, the processing stage would not increase the length of the input PHV. The MPUs 103 described in reference to FIG. 1 can be configured to determine whether the processing stage should increase the length of a particular PHV.

Finally, the processing stage provides the output PHV to (i) a next processing stage in the pipeline if the current processing stage is not a last processing stage or (ii) a de-parser or a direct memory access (DMA) engine if the current processing stage is the last processing stage.

The de-parser can use the output PHV to reassemble the packet. Alternatively, the DMA engine can use the PHV to write the packet associated with the PHV directly to memory on the computing system.

What is claimed is:

1. A method for processing packets, comprising:
receiving a packet comprising a header and a payload;
generating, using the header, an initial packet header vector (PHV);
providing the initial PHV to a pipeline comprising a plurality of processing stages; and
processing the initial PHV in the pipeline, wherein the processing comprises, for a current processing stage in the plurality of processing stages:
receiving, by the current processing stage, an input PHV, wherein the input PHV (i) is the initial PHV or a modified version of the initial PHV and (ii) comprises one or more flits,
applying a feature to the input PHV to generate an output PHV, including increasing an initial length of the input PHV if the initial length is not sufficient to apply the feature, and
alternating, in the pipeline, packets comprising a large number of flits and packets comprising a small number of flits to maintain an average packet processing rate that meets a predefined threshold.

2. The method of claim 1, wherein the processing further comprises:
providing the output PHV to (i) a next processing stage in the plurality of processing stages in the pipeline if the current processing stage is not a last processing stage or (ii) a de-parser or a direct memory access (DMA) engine if the current processing stage is the last processing stage.

3. The method of claim 1, wherein applying a feature to the input PHV comprises adding a new field to the input PHV.

4. The method of claim 1, wherein the initial PHV comprises a plurality of intrinsic fields.

5. The method of claim 4, wherein applying a feature to the input PHV comprises modifying one of the plurality of intrinsic fields of the initial PHV.

6. The method of claim 4, wherein applying a feature to the input PHV comprises replacing one of the plurality of intrinsic fields of the initial PHV with a new field.

7. The method of claim 1, wherein applying a feature to the input PHV comprises performing a match-action or a series of match-action combinations.

8. The method of claim 1, wherein the feature comprises an L2 or L3 header that specifies a destination of the packet.

9. The method of claim 1, wherein the feature comprises a flow table state.

10. The method of claim 1, wherein the feature comprises a firewall status.

11. The method of claim 1, wherein increasing the initial length of the input PHV comprises adding one or more flits to the input PHV through time division multiplexing.

12. The method of claim 1, further comprising:
processing, in the pipeline, packets in a priority order, wherein the priority order is defined by a quality of service tag associated with each packet.

13. A network interface module comprising:
input circuitry configured to receive a packet comprising a header and a payload;
a parser configured to generate, using the header, an initial packet header vector (PHV); and
a processing pipeline comprising a plurality of processing stages, wherein each of the plurality of processing stages is configured to:
receive an input PHV, wherein the input PHV (i) is the initial PHV or a modified version of the initial PHV and (ii) comprises one or more flits,
apply a feature to the input PHV to generate an output PHV, including increasing an initial length of the input PHV if the initial length is not sufficient to apply the feature, and
alternate, in the pipeline, packets comprising a large number of flits and packets comprising a small number of flits to maintain an average packet processing rate that meets a predefined threshold.

14. The network interface module of claim 13, wherein each of the plurality of processing stages is further configured to:
provide the output PHV to (i) a next processing stage in the plurality of processing stages in the pipeline if the current processing stage is not a last processing stage or (ii) a de-parser or a direct memory access (DMA) engine if the current processing stage is the last processing stage.

15. The network interface module of claim 13, wherein applying a feature to the input PHV comprises adding a new field to the input PHV.

16. The network interface module of claim 13, wherein the initial PHV comprises a plurality of intrinsic fields.

17. The network interface module of claim 16, wherein applying a feature to the input PHV comprises modifying one of the plurality of intrinsic fields of the initial PHV.

18. The network interface module of claim 16, wherein applying a feature to the input PHV comprises replacing one of the plurality of intrinsic fields of the initial PHV with a new field.

19. The network interface module of claim 13, wherein applying a feature to the input PHV comprises performing a match-action or a series of match-action combinations.

20. The network interface module of claim 13, wherein the feature comprises an L2 or L3 header that specifies a destination of the packet.

21. The network interface module of claim 13, wherein the feature comprises a flow table state.

22. The network interface module of claim 13, wherein the feature comprises a firewall status.

23. The network interface module of claim 13, wherein increasing the initial length of the input PHV comprises adding one or more flits to the input PHV through time division multiplexing.

24. The network interface module of claim 14, wherein the processing pipeline is further configured to:
process, in the pipeline, packets in a priority order, wherein the priority order is defined by a quality of service tag associated with each packet.

* * * * *